United States Patent

Spatz et al.

[11] Patent Number: 6,018,645
[45] Date of Patent: Jan. 25, 2000

[54] METHOD OF CHANGING THE SUPERVISOR PROGRAM INSTALLED IN A RECEIVER STATION FOR RECEIVING A RADIO BEAM, A CORRESPONDING RECEIVER STATION, AND A CORRESPONDING RADIO DATA-TRANSMISSION SYSTEM

[75] Inventors: Veronique Spatz, Puteaux; Michel Fropier, Noisiel; Nicolas Chastel, Puteaux, all of France

[73] Assignee: Alcatel Telspace, Nanterre Cedex, France

[21] Appl. No.: 08/781,191

[22] Filed: Jan. 10, 1997

[30] Foreign Application Priority Data

Jan. 12, 1996 [FR] France ................................. 96 00326

[51] Int. Cl.[7] ..................................................... H04B 1/40
[52] U.S. Cl. ............................................. 455/88; 455/418
[58] Field of Search .................................. 455/11.1, 13.1, 455/88, 3.1, 432, 418, 419, 420, 68, 517; 370/321, 337, 347, 442; 375/29

[56] References Cited

U.S. PATENT DOCUMENTS

| | | | |
|---|---|---|---|
| 5,159,625 | 10/1992 | Zicker | 455/432 |
| 5,297,191 | 3/1994 | Gerszberg | 455/419 |
| 5,495,518 | 2/1996 | Hayashi | 455/418 |
| 5,504,801 | 4/1996 | Moser et al. | 375/29 |
| 5,507,009 | 4/1996 | Grube et al. | 455/419 |
| 5,666,293 | 9/1997 | Metz et al. | 455/3.1 |
| 5,754,954 | 5/1998 | Cannon et al. | 455/419 |
| 5,761,618 | 6/1998 | Lynch et al. | 455/517 |

OTHER PUBLICATIONS

O. DeLuca et al, "New generation 140 and 155 mBit/s digital microwave system", *Commutation & Transmission*, 1991, France, vol. 12, No. 3, ISSN 0242–1283, pp. 61–76.

M. Peruyero et al, "Systeme de Surveillance et Exploitation des Arteres Hertziennes de Deuxiene Generation", *Commutation & Transmission*, 1989, France, vol. 11, No. 4, ISSN 0242–1283, pp. 33–46.

D. M. Milne, "Switch terminating equipment for MDR–2000 series digital radio", Globecom '85, IEEE Global Telecommunications Conference, Conference Record. Communication Technology to Provide New Services (Cat. No. 85CH2190–7), New Orleans, LA, USA–2–5 Dec. 1985, New York, NY pp. 1078–1082, vol. 3 IEEE.

*Primary Examiner*—Reinhard J. Eisenzopf
*Assistant Examiner*—Marsha D. Banks-Harold
*Attorney, Agent, or Firm*—Sughrue, Mion, Zinn, Macpeak & Seas, PLLC

[57] ABSTRACT

The invention relates to a method of changing the supervisor program installed in a receiver station (11) for receiving a radio beam (12) in a supervisory network, said method consisting in replacing instructions in a current supervisor program of said receiver station (11) with instructions of a new supervisor program on the basis of which said receiver station (11) is to operate, said radio beam (12) carrying at least one service path in addition to a main path. According to the invention, the method consists in conveying the instructions of the new supervisor program to said receiver station (11) via said service path. The invention also relates to a receiver station making it possible to implement such a method of changing the supervisor program.

6 Claims, 2 Drawing Sheets

METHOD OF CHANGING THE SUPERVISOR PROGRAM INSTALLED IN A RECEIVER STATION FOR RECEIVING A RADIO BEAM, A CORRESPONDING RECEIVER STATION, AND A CORRESPONDING RADIO DATA-TRANSMISSION SYSTEM

BACKGROUND OF THE INVENTION

The invention relates to transmitting data by radio. More precisely, the invention relates to a method of changing the supervisor program installed in a receiver station for receiving a radio beam, in a supervisory network.

In general, in a radio supervisory network, a main station (or master station) transmits a radio beam to one or more terminal stations.

The radio beam carries in particular a main path for conveying traffic data (or customer data), and a plurality of service paths for conveying data for supervising the network (in particular such as data associated with network configuration, the various protocols implemented, alarms, etc.)

If the distance between the main station and the terminal station is too great, one or more intermediate stations are then used, each of which serves as a repeater by receiving and re-transmitting the radio beam.

In the present description, the term "receiver station" is used in a very general sense to mean any station of the type for receiving a radio beam and operating under a supervisor program that it stores. Therefore, the term "receiver station" is used herein to designate both a terminal station and an intermediate station.

For various reasons, it may be necessary to replace the current supervisor program in a receiver station with a new supervisor program. When it is desired to modify the way in which the supervision of the network is operated, a new supervisor program for each of the receiver stations in the network must be developed and then installed to replace the old supervisor program. In addition, because networks are growing rapidly, it is becoming increasingly frequent to develop several successive versions of the same supervisor program. For each new version of the program, it is necessary to reinstall it in all of the receiver stations in the network.

In the state of the art, two main techniques are known that enable such a supervisor program to be changed.

In a first known technique, a person takes means for storing the new supervisor program (e.g. a floppy disk) to the site of the receiver station and loads the new supervisor program into the receiver station.

That first known solution suffers from the drawback of requiring staff to be sent to the receiver station. Staff must be sent to each of the receiver stations in the network and the overall cost of that is high (in terms both of labor costs and of travel expenses). Moreover, in view of the ever increasing rate of growth of currently installed networks, that total cost is tending to increase still further, because of the number of receiver stations, and because the distances to them are becoming increasingly long.

The second known technique consists in connecting the receiver station via a cable network to a network element storing the new supervisor program. The new supervisor program is then down-loaded by cable into the receiver station.

The second known solution suffers from the drawback of requiring a dedicated link between the receiver station and the network element storing the new supervisor program. Such a dedicated link is very rarely used, which makes it costly and inefficient.

SUMMARY OF THE INVENTION

A particular object of the invention is to mitigate those drawbacks of the state of the art.

More precisely, an object of the present invention is to provide a method of changing the supervisor program installed in a receiver station for receiving a radio beam in a supervisory network, the cost of implementing such a method being lower than the costs of implementing the methods known in the state of the art.

A further object of the invention is to provide such a method that requires neither staff to be sent to the receiver station, nor a cable link to the station.

Another object of the invention is to provide such a method that makes it possible to change the supervisor program of each of the receiver stations of the supervisory network as frequently as desired, at lower cost.

An additional object of the invention is to provide a receiver station enabling such a method to be implemented.

The invention achieves these objects and others that appear below by providing a method of changing the supervisor program installed in a receiver station for receiving a radio beam in a supervisory network, the method consisting in replacing instructions in a current supervisor program of the receiver station with instructions of a new supervisor program on the basis of which the receiver station is to operate, the radio beam carrying at least one service path in addition to a main path, said method consisting in conveying the instructions of the new supervisor program to the receiver station via the service path.

Thus, the general principle of the invention consists in down-loading the new supervisor program by using a radio service path in original manner. The instructions of the new supervisor program are carried to the receiver station by the radio beam that is usually received by said receiver station.

No additional transmission medium (of the cable link type or of some other type) is necessary. Furthermore, the invention does not require staff to be sent out. As a result, the cost of implementing the method of the invention is much lower than the costs of implementing known methods (in particular those requiring staff to be sent out, or requiring a cable link).

Advantageously, the receiver station to which the new supervisor program is addressed is identified by a specific address in the supervisory network, and the instructions of the new supervisor program, which instructions are conveyed via the service path, are accompanied by the specific address of the receiver station in the supervisory network, so that the receiver station detects, on the service path, its new supervisor program instructions.

Thus, each receiver station can receive a new supervisor program that is specific to it and suited to its needs. When (as described below) the network includes a plurality of intermediate stations, this also enables each intermediate station to know whether the instructions received over the service path are addressed to it or if they are to be re-transmitted to another intermediate station or to the terminal station.

Preferably, the radio beam is of the type constituted by a succession of data frames, each of which comprises a plurality of time slots, the service path being constituted by at least one particular time slot recurring in at least some of the frames.

In a preferred implementation of the invention, the method further consists in conveying a command to switch over from the current supervisor program to the new supervisor program after the instructions of the new supervisor program have been conveyed to the receiver station.

Thus, at the end of down-loading, after the switch-over command has been received, the receiver station is reset with the new down-loaded supervisor program.

The invention also provides a receiver station for receiving a radio beam in a supervisory network, the receiver station operating under a current supervisor program, the radio beam carrying at least one service path in addition to a main path, the receiver station including program-changing means for changing the current supervisor program, the program-changing means including:

means for receiving instructions of a new supervisor program via the service path carried by the radio beam; and means for storing the instructions of the new supervisor program.

Preferably, the program-changing means further include:

means for receiving a switch-over command to switch over from the current supervisor program to the new supervisor program, the command being received via the service path carried by the radio beam; and means for switching over from the current supervisor program to the new supervisor program after the switchover command has been received, so that the receiver station operates on the basis of the new supervisor program.

The invention also provides a radio datatransmission system, of the type including a main station and at least one terminal station, the terminal station receiving a radio beam transmitted by the main station, the terminal station being a receiver station as defined above.

Advantageously, the transmission system is of the type further including at least one intermediate station, each intermediate station receiving the radio beam either from the main station or from another intermediate station, and re-transmitting it either to the terminal station or to another intermediate station, each intermediate station also being a receiver station as defined above.

BRIEF DESCRIPTION OF THE DRAWING

Other characteristics and advantages of the invention appear on reading the following description of a preferred implementation of the invention, given by way of non-limiting example and with reference to the accompanying drawings, in which.

each of FIGS. 1, 2, and 3 is a simplified diagram of a distinct embodiment of a radio data-transmission system including one or more receiver stations of the invention.

DETAILED DESCRIPTION OF THE INVENTION

The invention thus relates to a method of changing the supervisor program installed in a receiver station for receiving a radio beam, in a supervisory network. The invention also relates to a receiver station as such, in that it enables such a method to be implemented.

The program changing that is to be performed in the context of the present invention consists in replacing the instructions of a current supervisor program in a receiver station with the instructions of a new supervisor program on the basis of which the receiver station is to operate.

The radio beam considered herein is of the type carrying at least one service path in addition to a main path. The service path is organized to convey data for supervising the network (network configuration data, protocol data, alarms, etc.).

Figure 1:
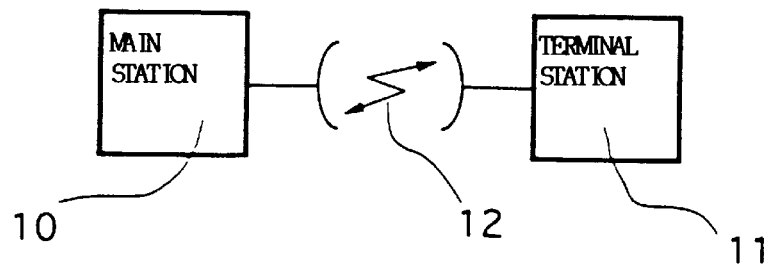
Figure 2:
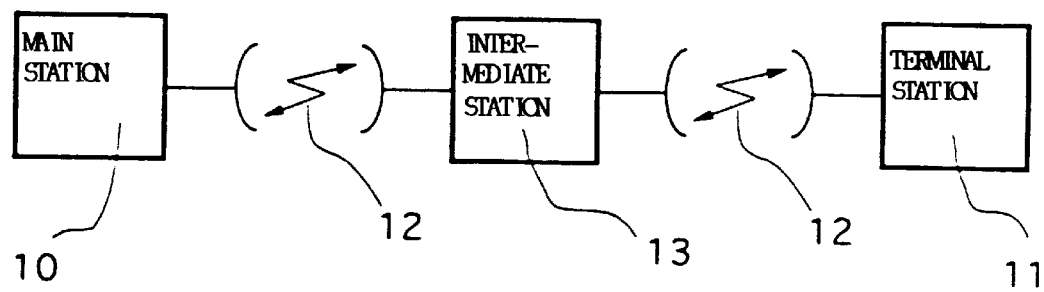
Figure 3:
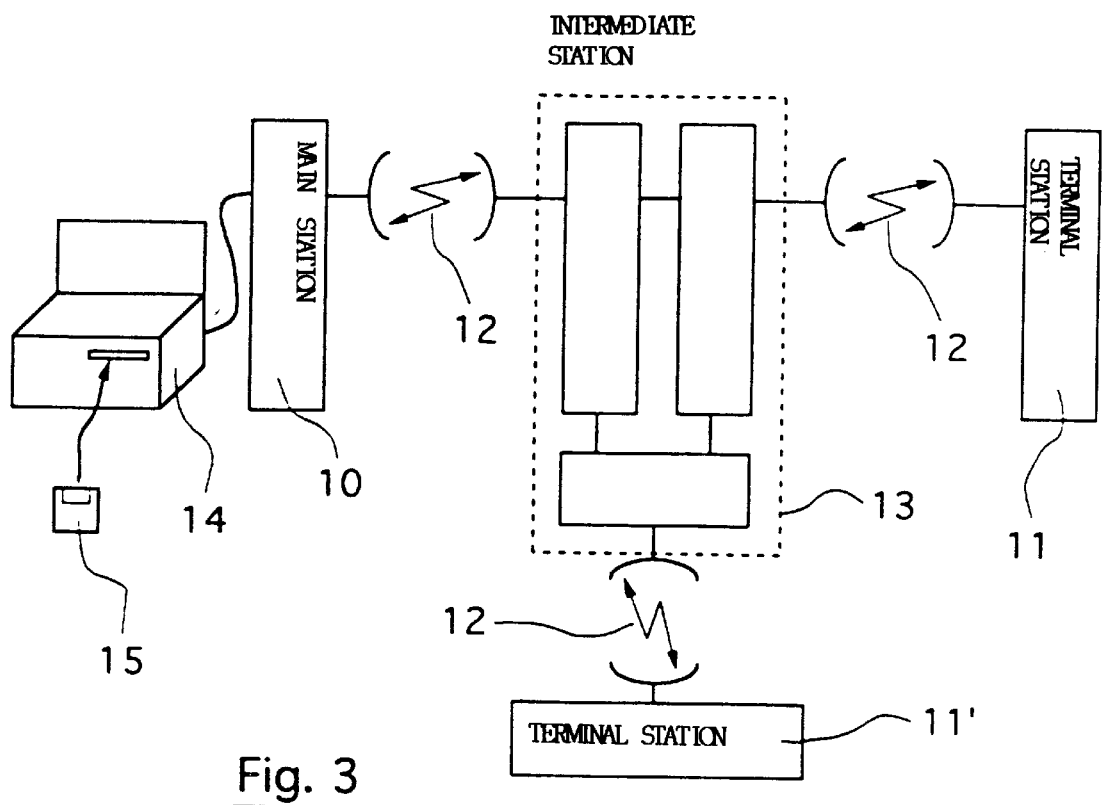

Each of FIGS. 1, 2, and 3 is a simplified diagram of a distinct embodiment of a radio data-transmission system including one or more receiver stations of the invention.

In the first embodiment shown in FIG. 1, the radio data-transmission system includes a main station 10 and a terminal station 11. The terminal station 11 receives a radio beam 12 transmitted by the main station 10. In this first case, it is the terminal station 11 that is the receiver station of the invention.

In the second embodiment shown in FIG. 2, the radio data-transmission system also includes an intermediate station 13. The intermediate station 13 receives the radio beam 12 from the main station 10 and re-transmits it to the terminal station 11. In this second case, both the intermediate station 13 and the terminal station 11 are receiver stations of the invention.

It is also possible to provide a plurality of intermediate stations 13 in cascade, between the main station 10 and the terminal station 11. In which case, each intermediate station 13 is also a receiver station of the invention.

In the third embodiment shown in FIG. 3, the radio data-transmission system includes a main station 10, an intermediate station 13, and two terminal stations 11, 11'. In this third case, the intermediate station 13 is a receiver station of the invention, as are both of the terminal stations 11, 11'.

A micro-computer 14 is connected to the main station 10. It can read a floppy disk 15 making it possible to store new supervisor programs to be down-loaded into each of the receiver stations (namely the intermediate station 13, and the two terminal stations 11, 11').

Thus, in all three of these embodiments of a radio data-transmission system, the term "receiver station" is used to designate both terminal stations 11, 11' and intermediate stations 13.

The term "receiver station" is used below in a very general sense to mean any station of the type for receiving a radio beam and operating under a supervisor program that it stores.

Figure 4:
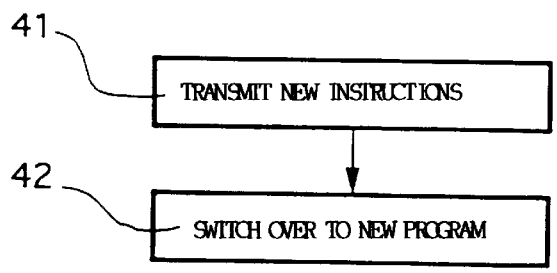
FIG. 4 shows the general principle of a preferred implementation of the method of the invention.

FIG. 4 shows the general principle of a preferred implementation of the method of the invention. A first step 41 of the method consists in conveying the instructions of the new supervisor program to the receiver station via the service path carried by the radio beam.

Optionally, a second step 42 of the method of the invention consists in conveying a command to switch over from the current supervisor program to the new supervisor program. For example, such a switch-over command may be conveyed to the supervisor program.

It is also possible to identify each receiver station by a specific address in the supervisory network. In which case, each time it sends instructions of a new program, the main station indicates the address of the receiver station to which said instructions are addressed. Thus, of all the various receiver stations that receive said instructions, only the receiver station concerned (the addressee receiver station) performs the method of changing the supervisor program.

Figure 5:
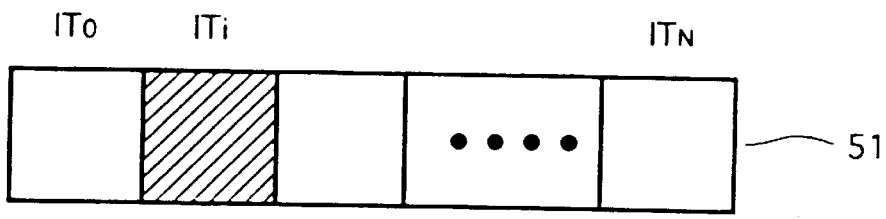
FIG. 5 shows an example of a frame structure making it possible to explain a preferred embodiment of the service path used in implementing the method of the invention.

FIG. 5 is an example of a frame structure that makes it possible to explain a preferred embodiment of the service path used in implementing the method of the invention.

In this example, it is assumed that the radio beam is of the type made up of a succession of data frames. As shown in FIG. 5, each frame 51 comprises a plurality of time slots $IT_O$ to $IT_N$.

A particular time slot $IT_i$ recurring in each frame 51 constitutes a physical channel. A plurality of logic channels can be multiplexed on the physical channel. For this purpose, the successive time slots of the physical channel (i.e. the slots $IT_i$ of the successive channels) are distributed between the various multiplexed logic channels.

For example, the service path may correspond to a physical channel of the radio beam on which a plurality of channels are multiplexed. One of the multiplexed channels is used to convey the instructions of the new supervisor program. The other channels are used, in conventional manner, to convey the data for supervising the network.

Figure 6:
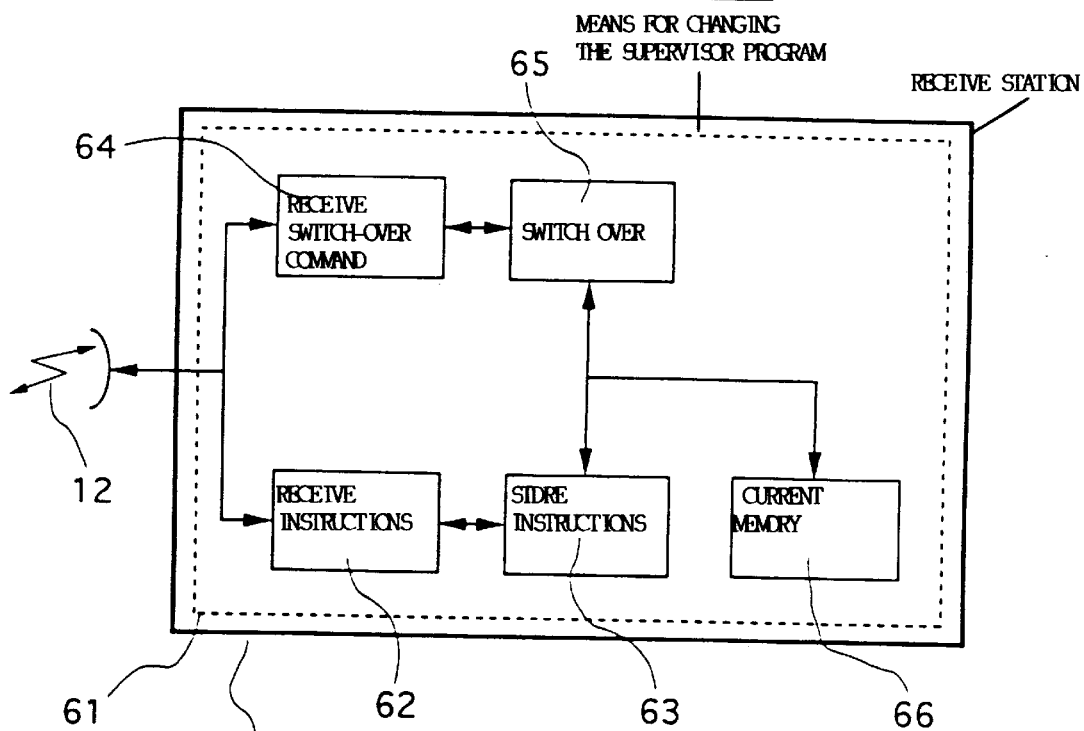
FIG. 6 is a simplified diagram of a preferred embodiment of a receiver station of the invention.

FIG. 6 is a simplified diagram of a preferred embodiment of a receiver station of the invention. The receiver station 60 includes means 61 for changing the current supervisor program, which means comprise:

means 62 for receiving the instructions of the new supervisor program via said service path carried by the radio beam 12; and means 63 for storing said instructions of the new supervisor program.

For example, the means 63 for storing the new supervisor program may be constituted by a buffer memory, distinct from the current memory 66 enabling the current supervisor program to be stored. The memories 63, 66 are re-writable memories (e.g. flash memories).

In which case, switching over from the current supervisor program to the new supervisor program consists in copying the contents of the buffer memory 63 into the current memory 66, and then in re-launching (by re-running or resetting) the program contained in the current memory 66 (which program is then the new supervisor program).

Optionally, the means 61 for changing the supervisor program also include:

means 64 for receiving a switch-over command to switch over from the current supervisor program to the new supervisor program, the command being received via the service path carried by the radio beam 12; and means 65 for switching over from the current supervisor program to the new supervisor program.

In which case, the reception means 64 activate the switch-over means 65 after they have received the switch-over command. For example, the switch-over means 65 may comprise means (not shown) for copying the contents of the buffer memory 63 into the current memory 66, and for re-launching the program contained in said current memory 66.

We claim:

1. A method of changing the supervisor program installed in a fixed receiver station (60; 11, 11', 13) for receiving a radio beam (12) in a supervisory network, said method comprising replacing instructions in a current supervisor program of said receiver station 960; 11, 11", 13) with instructions of a new supervisor program on the basis of which said receiver station (60; 11, 11' 13) is to operate said radio beam (12) carrying at least one service path in addition to a main path;

said method being characterized in that it comprises conveying (41) the instructions of the new supervisor program to said receiver station (60; 11, 11", 13) via said service path under control of a current supervisor program, and conveying (42) a command to switch over from the current supervisor program to the new supervisor program after the instructions of the new supervisor program have been conveyed to said receiver station (60; 11 11', 13).

2. A method according to claim 1, characterized in that said receiver station (60; 11, 11', 13) to which said new supervisor program is addressed is identified by a specific address in said supervisory network;

and in that said instructions of the new supervisor program, which instructions are conveyed via the service path, are accompanied by said specific address of the receiver station (60; 11, 11', 13) in the supervisory network, so that said receiver station (60; 11, 11', 13) detects, on said service path, its new supervisor program instructions.

3. A method according to claim 1, said radio beam being of the type constituted by a succession of data frames (51), each of which comprises a plurality of time slots (IT);

said method being characterized in that said service path is constituted by at least one particular time slot ($IT_i$) recurring in at least some of said frames.

4. A receiver station (60; 11, 11' 13) at a fixed location for receiving a radio beam in a supervisory network, said receiver station (60; 11, 11', 13) operating under a current supervisor program, said radio beam (12) carrying at least one service path in addition to a main path;

said receiver station being characterized in that it includes program-changing means (61) for changing said current supervisor program, said program-changing means including:

means (62) operating under said current supervisor program for receiving instructions of a new supervisor program via said service path carried by the radio beam;

means (63) for storing said instructions of the new supervisor program;

means (64) for receiving a switch-over command to switch over from the current supervisor program to the new supervisor program, the command being received via said service path carried by the radio beam; and means (65) for switching over from the current supervisor program to the new supervisor program after said switch-over command has been received so that said receiver station (60; 11, 11', 13) operates on the basis of said new supervisor program.

5. A radio data-transmission system, of the type including a main station (10) and at least one terminal station (11, 11'), said terminal station receiving a radio beam (12) transmitted by said main station;

said system being characterized in that said terminal station (11, 11') is a receiver station according to claim 4.

6. A system according to claim 5, of the type further including at least one intermediate station (13), each intermediate station receiving said radio beam (12) either from said main station (10) or from another intermediate station, and re-transmitting it either to said terminal station (11, 11') or to another intermediate station;

said system being characterized in that each intermediate station (13) is also a receiver station according to claim 4.

* * * * *